C. W. HAWKES.
WATER JACKET.
APPLICATION FILED JULY 31, 1908.
908,567.
Patented Jan. 5, 1909.
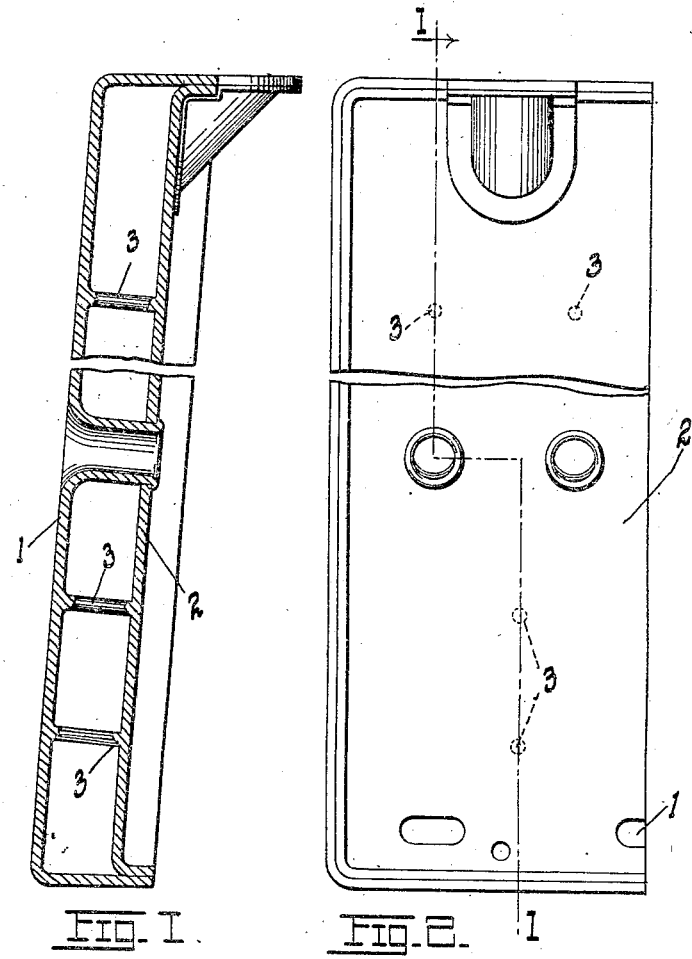
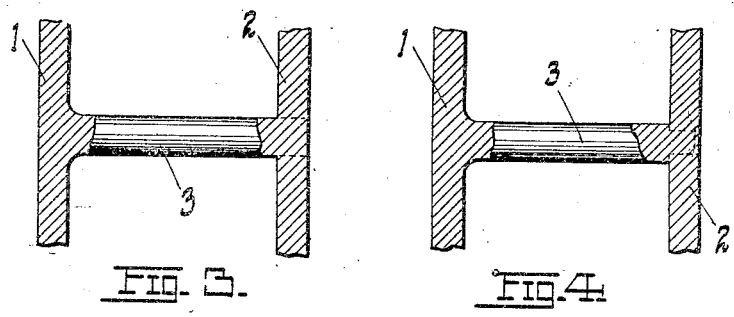
WITNESSES:
INVENTOR.
Charles W. Hawkes
BY
ATTORNEY.

UNITED STATES PATENT OFFICE.

CHARLES W. HAWKES, OF NEW YORK, N. Y.

WATER-JACKET.

No. 908,567.  Specification of Letters Patent.  Patented Jan. 5, 1909.

Application filed July 31, 1908. Serial No. 446,306.

*To all whom it may concern:*

Be it known that I, CHARLES W. HAWKES, a citizen of the United States, residing at New York, in the county of New York and State of New York, have invented certain new and useful Improvements in Water-Jackets, of which the following is a full, clear, and exact description, reference being had to the accompanying drawings, forming a part hereof.

My invention has relation to improvements in water-jacket constructions for cupola, blast and similar furnaces, and it consists in the novel construction of jacket more fully set forth in the specification and pointed out in the claims.

In the drawings, Figure 1 is a longitudinal section of the jacket taken on the line 1—1 of Fig. 2; Fig. 2 is an elevation of one-half of the jacket broken above the twyers; Fig. 3 is an enlarged section showing the welded stay-bolt spacing the water-jacket sheets or walls apart; and Fig. 4 is a section showing a stay-bolt provided initially with a limiting shoulder for engagement with the adjacent sheet, before the parts were welded.

The present improvement is in the nature of an extension of the principle covered by U. S. Patent on water-jacket numbered 815,013 issued to me under date of March 13, 1906, and while contemplating the several objects specified in said prior patent, the present jacket possesses the additional advantage in that it altogether precludes the possibility of leakage owing to the fact that the stay-bolts spacing apart the inside and outside sheets of the jacket are welded to both sheets. The advantage thus accruing from the specific modification made the subject-matter of the present application will be better apparent from a detailed description of the invention which is as follows:—

Referring to the drawings, and particularly to Figs. 1 to 3 inclusive, 1, represents the inside sheet and 2 the outside sheet of the water-jacket. In the present improvement all rivet-heads are eliminated from both the inside and outside sheets of the jacket. This I accomplish by welding first to the inside (or outside) sheet what constitute stay-bolts (or equivalent spacing members) in the prevailing forms of construction. Such welded stay-bolts are represented by the reference-numeral 3 in the drawing. After the sheets of the jacket have been assembled the opposite ends of the stay-bolts are welded to the opposite sheet, so that in the completed jacket both sheets are spaced apart by stay-bolts welded to both jackets. The methods of first welding the bolts to one of the sheets may correspond to any well known method in practice. In order to weld the free ends of the stay-bolts to the opposite sheet, openings are first formed in said sheet to receive the ends of the bolts for the assembled position of the sheets, when the ends so passed through are welded to the sheet by any of the means well known to the arts. In Fig. 3 the dotted lines shown on the outside sheet 2 in continuation of the peripheral elements of the bolt, indicate where the hole was through which the bolt was passed before the welding operation was completed.

A jacket of this character is practically indestructible since the stay-bolts being welded to the sheets or walls thereof become virtually integral therewith and leakage at these points is impossible.

Of course the application of the invention need not be restricted specifically to "water-jackets" as it will serve its purpose in air-jackets, steam-jackets, or gas-jackets of any description.

In Fig. 4 I show a stay-bolt originally provided with a reduced stem passed through the outside sheet, leaving a limiting shoulder for the sheet to rest on, but after the parts were welded, these features become obliterated. However, the dotted lines at the terminal of the stay-bolt where it joins the outside sheet illustrate the position of the stem originally formed on the stay-bolt.

Having described my invention, what I claim is:—

1. A water-jacket comprising an inside sheet and an outside sheet, and spacing members interposed between the sheets and welded thereto.

2. A water-jacket comprising an inside sheet and an outside sheet, and stay-bolts having their opposite ends integrally united to the respective sheets.

3. A water-jacket comprising an inside sheet and an outside sheet, and stay-bolts between the sheets, the stay-bolts being welded to the respective sheets.

4. A water-jacket comprising an inside sheet and an outside sheet, and stay-bolts having one end welded to one of the sheets, and the opposite end passed through the opposite sheet and welded thereto.

5. A water-jacket comprising an inside sheet and an outside sheet, and stay-bolts having one end welded to the inside sheet, and the opposite end passed through the outside sheet and welded thereto.

In testimony whereof I affix my signature, in presence of two witnesses.

CHARLES W. HAWKES.

Witnesses:
FREDERICK B. BLACKMAN,
SIDNEY ROLLE.